March 20, 1973 G. GARCEA 3,721,220
VARIATOR FOR THE SETTING OF THE CAMSHAFTS OF AN INTERNAL COMBUSTION ENGINE
Filed July 9, 1970 2 Sheets-Sheet 1
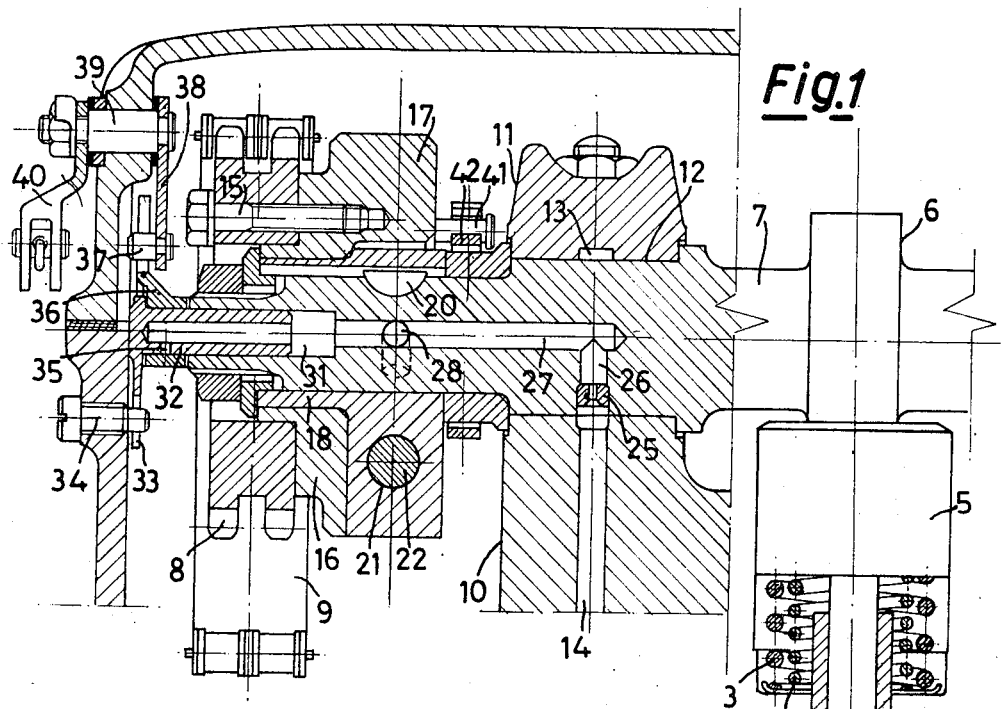
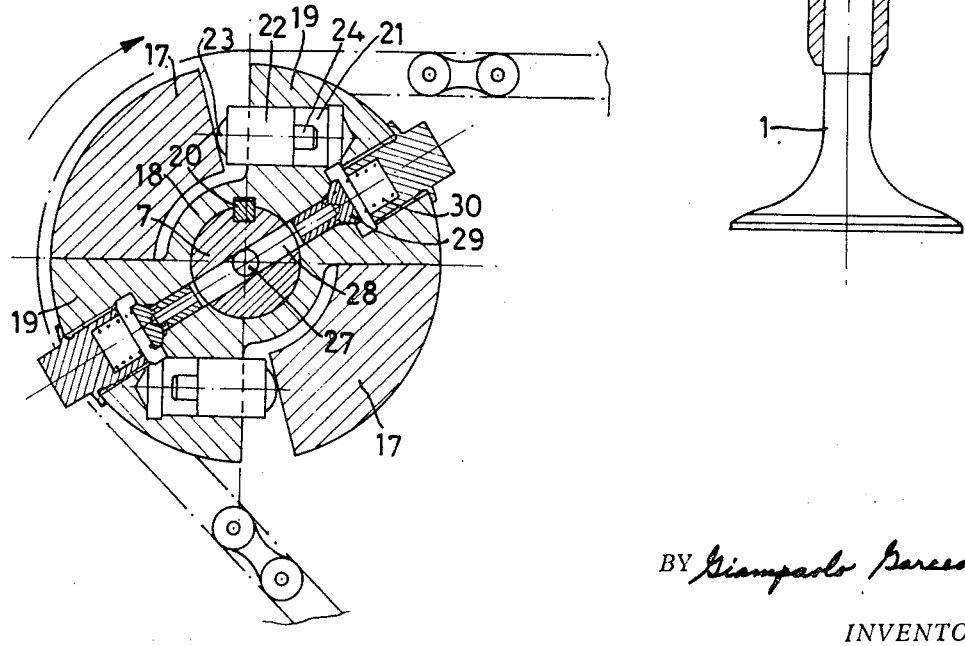
INVENTOR.
BY Giampaolo Garcea
Holman, Glascock, Downing & Seebold
ATTORNEYS

United States Patent Office 3,721,220
Patented Mar. 20, 1973

3,721,220
VARIATOR FOR THE SETTING OF THE CAMSHAFTS OF AN INTERNAL COMBUSTION ENGINE
Giampaolo Garcea, Milan, Italy, assignor to
Alfa Romeo S.p.A., Milan, Italy
Filed July 9, 1970, Ser. No. 53,381
Int. Cl. F01l *1/34*
U.S. Cl. 123—90.15                           4 Claims

ABSTRACT OF THE DISCLOSURE

The advance or delay of opening of the intake and/or exhaust valve in an internal combustion engine is obtained with the device disclosed herein as a function of the power instantaneously delivered by the engine. The indicating parameters can be the degree of opening of the throttle(s), the number of revolutions per minute of the crankshaft and the feeding pressure of the engine. A pressure-sensitive device exploits the pressure of the lubricant (oil) for effecting the phase adjustment of the camshaft.

BACKGROUND OF THE INVENTION

It is known that in the cycle of an internal combustion engine (4-stroke cycle), the exhaust stroke is immediately followed by the induction stroke: of course, during the exhaust stroke, the exhaust valve should be open whereas during the induction stroke, the intake valve should be open. It is also obvious that the exhaust valve should constantly be wholly open during the entire exhaust stroke so as to provide a good scavenging action, with the same being also true of the intake valve in order to provide, during the induction stroke, a satisfactory filling of the cylinder with a fresh mixture. It is known that the opening and closing of the valves of the kind as conventionally used do not take place instantaneously, but rather gradually, as a function of the outline of the controlling cams. It is for this reason, above all, as is well known, that the exhaust valve should start its opening before the piston starts its exhaust stroke, if one desires that, as the piston starts said stroke, the valve may be yet sufficiently open, and should close after the end of the exhaust stroke to be still sufficiently open as the piston has gone through its exhaust stroke. Similarly, the intake valve should start its opening before the piston starts its induction stroke. The result is that, within the field of a certain angle of rotation of the crankshaft in the vicinity of the upper dead center (i.e. the exhaust position), both the intake and the exhaust valves are partially open. This fact, as is well known, may originate the following basically irregular situations:

(a) Exhaust gases reflow from the combustion chamber into the intake duct (through the partially open intake valve) due to the effect of a positive pressure differential between the combustion chamber and the intake duct: said positive pressure differential can be due to the negative pressure obtaining in the induction duct if the throttle is partially closed (engine not "flat-out"); it may also be due to the motion of the piston which is about to terminate its exhaust stroke when the exhaust valve is still only partially open.

(b) Exhaust gases flow back from the exhaust duct into the combustion chamber and, therefrom, into the intake duct (through the exhaust and intake valves which are both partially open) by virtue of a positive pressure differential between the exhaust duct and the intake duct: said positive pressure differential could also be due to the back-pressure as originated by the resistance of the mufflers and the length of the exhaust gas ducts and also by virtue of a negative pressure obtaining in the intake duct if the throttle is partially closed (non "flat-out" engine).

(c) Exhaust gses flow back from the exhaust duct into the combustion chamber (through the partially open exhaust valve) by virtue of a positive pressure differential between the exhaust duct and the combustion chamber: said pressure differential is induced by the movement of the piston when starting the inlet stroke.

The occurrence of the situations which have been enumerated above is a consequence, as aforesaid, of the existence of pressure differentials which encourage the backflow of gases: for the cases (a) and (b), the pressure differentials of this kind may be especially due to the negative pressure at the induction duct when the engine operates with a partially closed throttle. In operation under the "flat-out" condition, conversely, the simultaneous opening of both the intake and exhaust valves may have a positive influence to the end of charging the mixture and this occurs in engines which have been specially designed to exploit inertial phenomena in the column of fluid which is drawn into the cylinder or also resonance waves which are originated in the intake and exhaust ducts by the cyclically alternated movement of the fluid in the ducts themselves. In such a case, the positive pressure differentials between the induction and the exhaust ducts may occur just during the simultaneous opening of both the intake and exhaust valves: if, by so doing, the air or the new mixture carries out a scavenging of the explosion chamber, an increase of the charge and thus of power can be obtained.

It stems from the above considerations that, if the entire field of utilization of the engine is considered, whose points are characterized by a particular couple of values of "engine r.p.m." and "intake pressure" (or "engine r.p.m." and "angles of the intake throttle"), there can be distinguished in its zones in which the simultaneous opening of the above mentioned valves is an advantage and zones in which this is a shortcoming.

In the light of the foregoing, it has been envisaged to provide, in an internal combustion engine in which each cylinder is provided with an intake valve and an exhaust valve, with each valve being controlled by a proper cam, means for transmitting a rotation drive from the engine crankshaft to the cams, the transmitting means including at least a variating means of the phase setting of at least one cam, the variating means comprising a first rotating member driven into rotation by the crankshaft and a second rotary member rigidly connected to and coaxial with at least one cam, a second rotary member being driven into rotation by the first rotating member, with the driving engagement between the first and second members taking place through abutment spacing means movable between one position in which the two members assume a predetermined angular relationship to each other and another position in which the two members are angularly differently positioned to each other.

SUMMARY OF THE INVENTION

On the basis of a comprehensive analysis of the starting conditions as mentioned above (on the situations which may occur, or not, in the several operative areas as a function of the angle of simultaneous opening and the timing of this angle with respect to the crankshaft) and also on the basis of the results of field tests which have been purposely carried out, the following conclusions have been reached:

(1) To the end of the optimization of the operation in the several zones of the field of use of the engine, it is efficacious, during the operation of the engine, to vary the timing of the camshaft (in case of only one camshaft controlling both the intake and the exhaust valves) or of either camshaft (in case of twin camshaft internal combustion engines) with respect to the crankshaft, and hence the time length of simultaneous opening of the intake and exhaust valves.

(2) Again, to the ends of the optimization as for (1) above, it is advisable that the phase variation may take place as the partial cut off of the engine feed is varied, rather than concurrently with a variation of the engine r.p.m.

(3) The above mentioned optimization can also be achieved by merely sub-dividing the entire field of use of the engine into two zones, one of which is characterized by a less intense reduction of the feed, the other by values which are higher than a given reduction so that, below said reduction, a certain phase is adopted, and another phase relationship is adopted above said reduction. This approach has proven to be more advantageous than the variation of phase carried out as a function of the engine r.p.m. Obviously one can use, as a magnitude for indicating the degree of feed reduction, either the feed pressure, or the throttling angle.

The functional advantages stemming from the adoption of the present device are considerable, but, obviously, the intricacy, the bulk and the first cost should not exceed certain limits to be compatible with mass production, so that a particular embodiment of the device is also a part of the present invention. This particular embodiment is characterized, above all, by the fact that the energy for the variation of the phasing relationship is drawn from the existing lubrication circuit for the lubrication of the engine under pressure, thus avoiding, for example, the exceedingly high loads on the accelerator pedal which are experienced if the phasing variation is carried out by acting directly on the accelerator pedal, and also avoiding the bulk which would be necessary if, to obtain said energy, the negative pressure in the intake duct should be used. Another feature of the device is its compactness, a feature which is necessary on account of the fact that, to obtain a phase relationship variation, the device should be rotary, at least in its essential portion, with the camshaft for which the phase variation is desirable. The difficulty in solving the problem is originated by the magniture of the driving torque which should be overcome in order to effect the positive phase variation, that is, to advance the timing phase and is also originated by the compactness requirement which reduces the lever arm of the forces which correspond to said torque, so that the latter forces are such as to demand an exceedingly high size for the active surfaces on which the low pressure of the lubricating oil exerts its influence. The problem has been solved by considering that the driving torque of a camshaft is not constant but it is cyclically variable between a positive maximum value and a minimum value (which can also be negative) as a function of the positions of the several cams with respect to their respective cam followers and it has been thought to exploit the time intervals in the neighborhood of the minimum value aforementioned to effect, by the agency of the low pressure of the lubricating oil, the positive phase variations, by avoiding, with the use of a small nonreturn valve, that negative phase variations may occur during the time intervals in the neighborhood of the maximum value of the driving torque. By so doing, when the device is fed by the pressurized engine oil, the phase of the camshaft is the most advanced one as defined with respect to a specially provided end abutment, whereas the phase is the most delayed one when the oil pressure in the device is lacking, since the oil which had previously entered the device may escape therefrom through the several clearness.

A cock valve only is necessary, which, according to its setting, permits that the oil may reach, or not, the device.

In the light of the foregoing, this cock valve can be controlled by the feeding pressure of the engine or also by a simple leverage as connected to the accelerator pedal.

The device of the present patent application can be better illustrated with reference to the accompanying drawing, wherein:

BRIEF DESCRIPTION OF THE DRAWINGS

FIG. 1 is an axial cross-sectional view of the camshaft,
FIG. 2 is a conventional cross-sectional view.

DETAILED DESCRIPTION OF THE DRAWINGS

Figure 3:
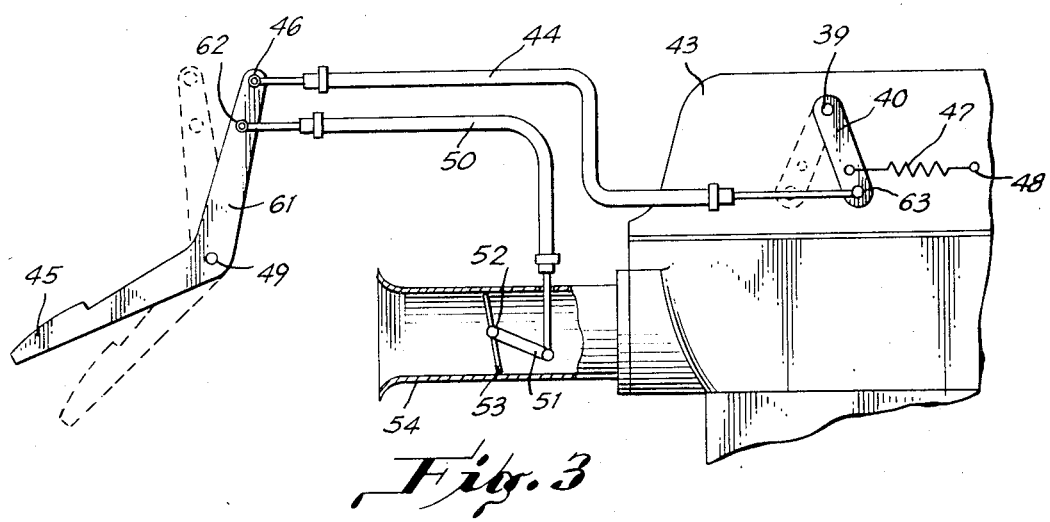
FIG. 3 is a diagrammatic view of the control of the setting of the camshaft being dependent upon the position of the accelerator pedal.

FIG. 1 shows an intake valve 1 of one of the engine cylinders, with its valve guide 2, valve springs 3 and 4 and valve spring cover 5 on which a cam 6 of a camshaft 7 is active, with the shaft 7 being controlled by a pinion 8 and a chain 9 which receives the drive from the crankshaft (not shown in the drawing).

There is also shown a supporting member 10 with its cap 11 for the camshaft. Matching surfaces 12 between the camshaft and the supporting member are lubricated by the pressurized lubrication oil of the engine, with the oil entering into a hollow 13 via a duct 14. The pinion 8 is not directly keyed to the camshaft 7 but is fastened, by means of screws 15, to a ring 16, with the ring 16 having integral therewith two projections 17 which can be seen in FIG. 2. One of these projections can be seen also in FIG. 1. These two projections, having the shape of sectors of a toroidal element, project from the ring 16 in correspondence with the face away of the face connected with the gear 8. Similar projections 19, also consisting of sectors of a toroidal element, are integral with a ring 18 placed in the interior of the ring 16. The connection between the two rings is such as to allow relative rotations of the one ring with respect to the other. The relative rotations can occur since the peripheral extension of the two sectors 17 is narrower than the peripheral extension of the hollows left free by the projections 19. The ring 18 is keyed to the camshaft 7 by means of a key 20 engaged in splines specially provided in the two elements. Since the direction of rotation of the pinion 8 is clockwise as viewed in FIG. 2, the pinion by means of the ring 16 and the projections 17 can drive the camshaft by the agency of the projections 19 integral with the ring 18, with the latter being keyed to the camshaft. The drive however, can be transferred in two different ways since, in the projections 19, two cylindrical blind holes 21 are formed, which open onto the planar surfaces of the sectors 19 which, during the aforesaid drive transfer, would tend to match the corresponding planar surfaces of the sectors 17.

Plungers or pistons 22 can slide axially in the holes 21 and the clearance between the plungers and their holes is extremely slight. The plungers 22 each have a spherical cap 23 at the end, and can project out of the hole and have a short extension 24 in correspondence with their end towards the bottom of the hole.

If the plungers 22, by virtue of the thrust imparted thereto by the projections 17 during the driving of the camshaft, enter the interior of the cylindrical holes 21 either of the driving transfer ways cited above is obtained: obviously, the camshaft has a retarded phasing with respect to the pinion and thus relative to the crankshaft. If, on the contrary, the plungers 22 cannot enter the holes due to the presence of oil in the holes (or they are pushed outward by oil pressure in the holes), the second way of driving is obtained; obviously the camshaft has now an advanced phasing. In the interior of the cylindrical hole, the oil of the lubrication cylinder of the engine arrives through the channel 14 and the restricted passageway of a calibrated hole 25 and to ducts 26, 27 and 28, all formed through the camshaft 7 and from the duct 28, the oil passes to an automatic valve 29 having a spring 30 which tends to close the valve. The cavity placed downstream of the valve is in communication with the bottom of the blind cylindrical hole 21 in which the plunger 22 is housed. At the end of the camshaft 7, a cylindrical bore 31 also communicates with the oil duct 27 and the bore 31 houses a small cylinder 32 which can be rotated and slid with respect thereto even though the clearances are narrow to prevent oil leakages. The small cylinder 32 is held stationary when the camshaft is rotated, by the agency of an arm 33 integral with the cylinder, inasmuch as the end of the arm 33 has a groove engaging the cylindrical end of a screw 34 which is affixed to the engine base. Through a coaxial hole in the cylinder 32, the oil arrives at a radial bore 35. Oil can be prevented from emerging through the bore 35 by a bushing 36 slipped onto the cylinder 32. If, however, the bushing 36 is rotated so as to cause a hole formed therein (not shown in the drawing) to register with the radial bore 35, oil can emerge through the end of the camshaft and be dumped in the engine sump. On account of the restricted bore 25, the pressure of the oil upstream of said bore drops virtually to zero. Since the bushing 36 also has an arm, it can be rotated (so as to close or open the bore 35) by means of an abutment 37 integral with a lever 38 keyed to a pin 39 which has a lever 40, with the lever 40 being actuable from the outside of the engine.

It will be seen in FIG. 3 that the lever 40 has a first end pivoted to a pin 39 which in turn is fixed to a stationary part 43 of the engine. The other end of the lever 40 is pivoted at 63 to a linkage assembly 44. The other end of the linkage assembly 44 is pivoted at 46 to an accelerator pedal 45 fulcrummed at 49 to the vehicle body. A throttle 53 is positioned in intake duct 54 of the engine and the accelerator pedal 45 is connected to the throttle via linkage 51, 52, 50 and 62. It should be pointed out that in FIG. 3, the solid lines represent the operating conditions when the accelerator pedal is fully released.

The lever 40, under the action of a spring 47, anchored to the stationary part 43 at 48, is in the extreme angular position thereby keeping the bushing 36, by means of the lever 38, in the position in which the hole in the bushing 36 registers with the bore 35 in the cylinder 32. Consequently, the lubricating oil under pressure, coming from the duct 27, is discharged into the sump of the engine.

When the accelerator pedal 45 is depressed, the throttle 53 is opened and the lever 40 is rotated together with the bushing 36. Since the discharge hole of the bushing 36 is properly sized, upon rotating the bushing 36 for an angular extent greater than a predetermined angle, which is suitably fixed upon designing the device, such hole no longer registers with the bore 35 thereby preventing the lubricating oil from being discharged into the sump. The oil pressure causes the pistons or the plungers 22 to be urged towards the protruding position from the blind holes 21, with the displacement of the pistons 22 occurring as soon as the time of minimum value of the camshaft driving torque is momentarily established. As a result of the displacement of the pistons 22, the member 18 having the projection 19 is angularly displaced in the same direction with respect to the direction of rotation of the camshaft 7 thus obtaining a more advanced phasing of the camshaft per se with respect to the crankshaft. According to the position of the external lever 40 there can be a zero oil pressure, or a positive oil pressure, in the duct 2 equal to the pressure of the engine lubrication oil. In the former case, in fact, the pressure of the lubrication oil, which is not enough to push the plungers 22 outwardly in the instants of time when the driving torque of the camshaft is at a maximum (if the shaft carries four cams this situation occurs four times at every revolution of the camshaft), it is sufficient to lift the automatic valve 29 and to direct oil to the cylindrical holes 21 and thus push the plungers 22 outwards in the intervals between the instants of time in which the driving torque is at a maximum, that is to say, whenever the driving torque is at a minimum. The automatic closure of the valve and the degree of sealtightness between the plungers 22 and the cylindrical holes 21 act in such a way that, during the instants of time of maximum torque, the plungers do not virtually enter the holes again, thus permitting that an advanced phasing of the camshaft may be obtained.

By rotating the external lever 40 so as to cancel the oil pressure in the duct 27, the intermittent oil feed to the cylindrical holes 21 (through the valve 29) is discontinued and due to the effect of the leakage between the plungers and the cylindrical holes, the plungers can be brought inside again and the delayed phasing is rapidly obtained. A leaf spring 42, arranged in ringlike form and coaxially with respect to the camshaft, has its two ends bound to a pin 41 affixed to the projection 17 on the one hand, and to another pin affixed in the same way to the projection 19, on the other hand. The preload of the spring has such a direction and such a magnitude as to prevent that, in the case of a negative minimum driving torque, pulsatory movements and thus noisy operation may take place during the delayed-phase operation.

Figure 4:
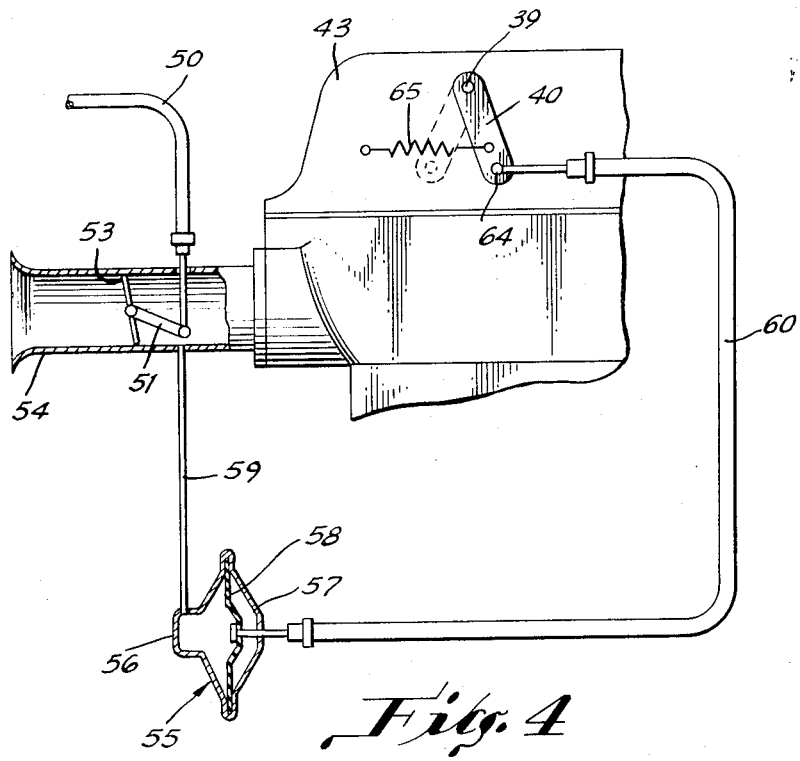
FIG. 4 is a diagrammatic view in which the control is through the intake negative pressure of the engine.

In FIG. 4, there is disclosed a modified control mechanism for the lever 40. More specifically, in this embodiment the displacement of the lever 40 is controlled by the intake negative pressure of the engine. A depression capsule 55 is divided by a deformable membrane 58 into two cavities or spaces 56 and 57. The cavity 56 is connected by a small duct 59 to the intake duct 54 downstream of the throttle 53 so that in the cavity 56, the feeding pressure of the engine, i.e., the pressure existing in the intake duct downstream of the throttle and which pressure is well known as a parameter representative of the power generated by the internal combustion engine is sensed. Atmospheric pressure exists in the cavity or space 57. One end of a linkage arrangement 60 is connected to the membrane 58 while the other end is pivoted at 64 to the lever 40.

The lever 40 is urged towards its rest position by a spring 65 and until the feeding pressure is below a prefixed value, the oil pressure, as above discussed, is discharged into the engine sump because the membrane 58 under the pressure differential acting thereupon does overcome the action of the spring 65. The feeding pressure increases, the lever 40 is gradually displaced towards the left (as viewed in FIG. 4) thereby actuating the device.

In a further embodiment, the lever 40 is controlled as a function of the engine r.p.m. and this embodiment is quite similar to that illustrated in FIG. 4. It is merely a question of providing a control device, for example, a centrifugal governor in which the variations of the rotation speed of the crankshaft are converted into a displacement of a control member which in turn would control the displacements of the lever 40.

What I claim is:

1. In an internal combustion engine provided with cylinders, each cylinder having an intake valve and an exhaust valve, a proper cam for controlling each valve, a crankshaft, a means for transmitting a rotation drive from the crankshaft to the cams, said transmitting means including at least a varying means of the phase setting of first rotary member driven into rotation by the crankshaft and a second rotary member rigidly connected to and coaxial with at least one cam, said second rotary member being driven into rotation by said first rotary member, with the driving engagement between first and second rotary members taking place through abutment spacing means movable between one position in which the two rotary members assume a pre-determined angular relationship to each other and another position in which the two rotary members are angularly differently position, with respect to each other, said first rotary member being provided with radially opposed projections having a suitable angular extension, said second rotary member being provided with radially opposed projections having a suitable angular extension, the projections of the first rotary member being positioned in the spaces left free by the projections of the second rotary member so as to be co-planar with the projections of the second rotary member, the angular extensions of the projections of the first rotary member being less than the spaces left by the projections of the second rotary member thereby allowing relative rotation motions to take place between said projections hence between the first and second rotary members, each projection of one of said rotary members is provided with a blind hole having an axis tangent with respect to a circumference coaxial with the camshaft, a plunger slidably mounted in each blind hole and having an end adapted to protrude from the hole and to abut the adjacent side wall of the near projection of the other rotary member, the diameters of each blind hole and plunger being such as to permit oil to be discharged from the front end of the hole, and means to subject the inner end of the plunger to oil pressure including an automatic valve allowing oil under pressure to enter the holes when the driving torque of the camshaft takes, during its cyclic variation, low values, while preventing the return of oil from the holes when the torque takes high values.

2. The internal combustion engine as claimed in claim 1 in which said first rotary member is driven into rotation via a pinion secured to the first rotary member, and a chain trained about the pinion.

3. The internal combustion engine as claimed in claim 1, in which the control for the oil pressure for the actuation of the plungers includes a pivoted lever located externally of the engine, an accelerator pedal, an inlet duct, a throttle located in the inlet duct, a first linkage connecting the lever to the accelerator pedal, and a second linkage connecting the throttle to the accelerator pedal.

4. The internal combustion engine as claimed in claim 1 in which the control for the oil pressure for the actuation of the plungers includes a pivoted lever located externally of the engine, an inlet duct, a throttle located in the inlet duct, an accelerator pedal, a capsule divided by a deformable membrane into two spaces, one of the spaces being connected to the intake duct downstream of the throttle, atmospheric pressure existing in the other space, linkage means connecting the membrane to the lever, second linkage means connecting the throttle to the accelerator pedal, and spring means urging the lever to its rest position.

References Cited
UNITED STATES PATENTS

| | | | |
|---|---|---|---|
| 2,804,061 | 8/1957 | Gamble | 123—90.18 |
| 2,773,490 | 12/1956 | Miller | 123—90.16 X |
| 2,936,575 | 5/1960 | Lieberherr | 123—90.16 X |
| 2,305,787 | 12/1942 | Kales | 123—90.15 |
| 2,159,017 | 5/1939 | Duncan | 123—90.15 |
| 2,488,361 | 11/1949 | Witzky et al. | 23—90.15 X |
| 3,004,410 | 10/1961 | Pierce | 123—90.15 X |
| 3,109,417 | 11/1963 | Bekkala et al. | 123—90.15 |
| 3,331,256 | 7/1967 | Morris | 123—90.15 X |
| 3,369,532 | 2/1968 | McIlroy | 123—90.16 |
| 2,326,329 | 8/1943 | Camp | 123—90.15 |

AL LAWRENCE SMITH, Primary Examiner